Sept. 27, 1966  E. R. PLASKO  3,275,014
FLUID CONTROL MEANS
Filed Sept. 12, 1963
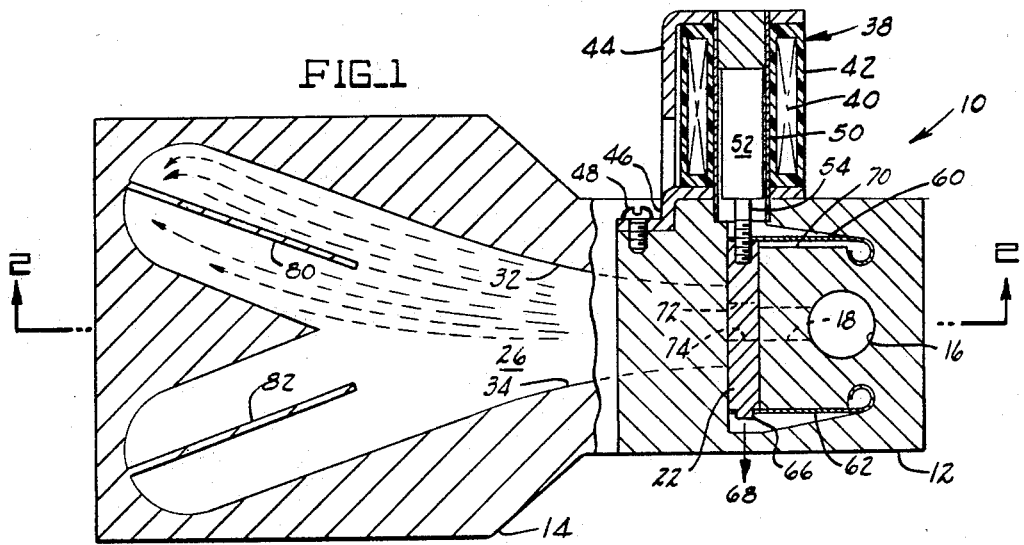
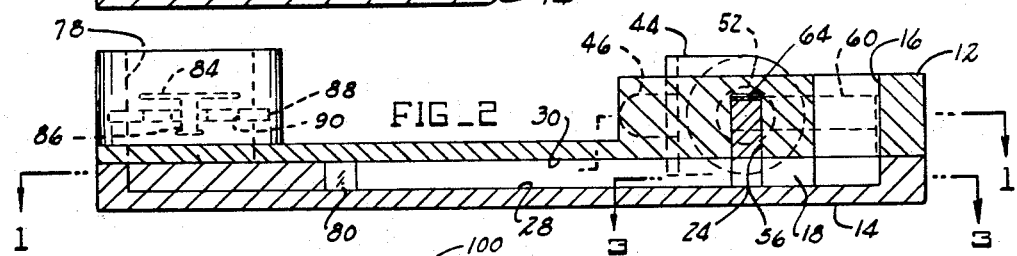
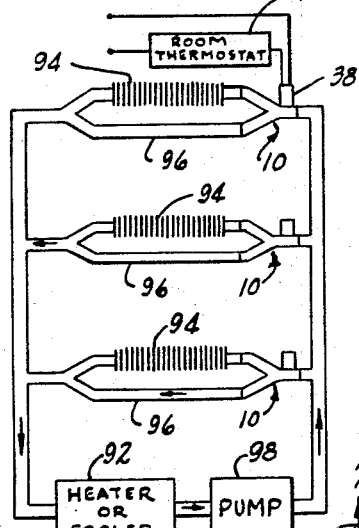
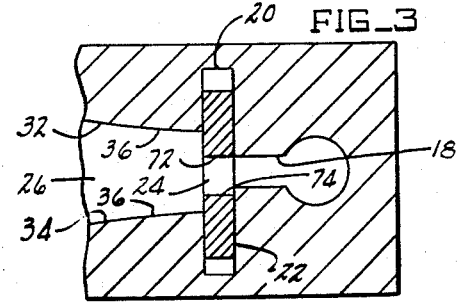
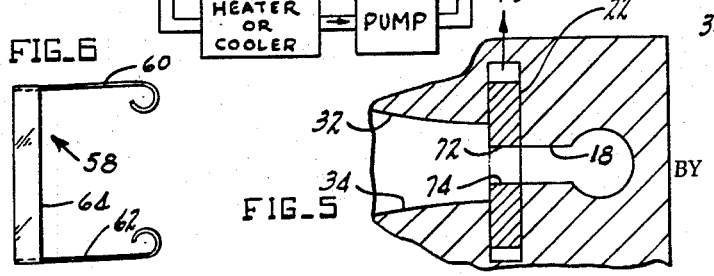
INVENTOR.
EMIL ROBERT PLASKO
BY JOHN E. McRAE
ATTORNEY

United States Patent Office 3,275,014
Patented Sept. 27, 1966

3,275,014
FLUID CONTROL MEANS
Emil Robert Plasko, Walled Lake, Mich., assignor to American Radiator & Standard Sanitary Corporation, New York, N.Y., a corporation of Delaware
Filed Sept. 12, 1963, Ser. No. 308,390
2 Claims. (Cl. 137—81.5)

This invention relates to a fluid switch and to an air conditioning system in which the switch is used.

One object of the invention is to provide a fluid switch wherein relatively small operating forces are effective to switch fluid from one path to another.

A further object is to provide a fluid switch which has a minimum number of parts, and which has close tolerance requirements on only a few of its parts.

An additional object is to provide a fluid switch which does not require any moving seals, and which therefore has a relatively long service life.

Another object is to provide a fluid switch having a relatively quick response time.

A further object is to provide an air conditioning system which utilizes the above-described fluid switch.

Other objects of this invention will appear from the following description and appended claims, reference being had to the accompanying drawings forming a part of this specification wherein like reference characters designate corresponding parts in the several views.

In the drawings:

FIGURE 1 is a sectional view through a switch embodying the present invention, taken on line 1–1 in FIG. 2;

FIG. 2 is a sectional view taken on line 2–2 in FIG. 1;

FIG. 3 is a fragmentary sectional view taken on line 3–3 in FIG. 2, but with a nozzle member shifted from the FIG. 1 position;

FIG. 4 is a schematic representation of an air conditioning system in which the FIG. 1 system is utilized;

FIG. 5 is a fragmentary sectional view in the same direction as FIG. 3, but illustrating features of another fluid switch of this invention;

FIG. 6 is a plan view of a spring used in the FIG. 1 switch; and

FIG. 7 is a fragmentary sectional view illustrating features of an additional fluid switch incorporating features of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The invention broadly encompasses a fluid switch wherein a jet of inlet fluid is directed into one of two outlet paths by being locked onto selected ones of two path-forming wall surfaces, as by what is known as boundary layer action. Such action is discussed for example in United States Patent No. 3,001,539.

Under the boundary layer action principle the inlet fluid is forced through a nozzle into a passage which has wall surfaces thereof offset transversely from the nozzle opening. The offset surfaces form regions of low pressure which draw the fluid toward one or the other of the surfaces. Directional control of the flow is under prior art practice usually achieved by controlling the relative pressures in the low pressure regions, as by forcing a transverse jet of fluid into one of these regions or withdrawing fluid from one of the regions. Devices using such control features are usually termed fluid amplifiers.

The present invention utilizes the boundary layer action principle but achieves directional control of the flow by varying the position of the nozzle relative to the low pressure control regions. Thus, in one nozzle position the nozzle opening is located relatively close to one of the boundary layer control walls so that the fluid issuing from the nozzle is locked onto that wall. In another position the nozzle is located relatively close to the other boundary layer control wall so that the fluid then locks onto the other wall. As is conventional, one of the control walls leads the fluid to one outlet, and the other control wall leads the fluid to a second outlet. By varying the nozzle position it is thus possible to selectively direct the fluid into one outlet path or another.

The forces necessary to shift the nozzle between its different positions are considerably less than would be necessary to operate a conventional valve of equivalent flow capacity. Thus, by using this invention it is possible to control large fluid flows with relatively small control forces, such as are available for example with small low cost solenoids. The required nozzle movement is very small, as for example in the neighborhood of $3/64$ inch, so that solenoids with very small armature movements can be employed.

As shown in FIGS. 1 and 2, the invention is embodied in a fluid switch 10 comprising two housing members 12 and 14 suitably secured together by screws or other clamping means, not shown. Housing member 12 is provided with a cylindrical fluid inlet opening 16 which leads to an inlet duct 18 formed in the upper face of member 14. Also formed in member 14 is a transverse slideway 20 which accommodates the lower portion of a slidable nozzle member 22. As best shown in FIG 3, member 22 is of plate-like form, and is provided with an orifice 24 in fluid registry with inlet duct 18. In the illustrated construction both the orifice and duct are of rectangular cross section, although other cross sections can presumably be employed in practicing the invention.

Nozzle member 22 is interposed between duct 18 and an expansion passage 26 which is defined by a flat floor surface 28, a flat roof surface 30, and two diverging side wall surfaces or boundary layer lock-on walls 32 and 34. As shown in FIG. 1, surfaces 32 and 34 are offset outwardly from duct 18. The effect of such offsetting is to create two low-pressure regions 36 when fluid is issuing from nozzle 22. In operation, the fast moving nozzle fluid tends to maintain the direction given to it by the nozzle so that relatively stagnant fluid is drawn from regions 36 to create the low pressure condition. The low pressure in turn draws the jet of fluid toward one of wall surfaces 32 or 34, depending on the adjusted position of the nozzle.

In the illustrated arrangement adjustment of the nozzle is accomplished by a solenoid 38 which comprises a coil section 40, an encapsulating shell 42, and a magnetic frame 44. Securement of the frame to housing member 12 is accomplished by a struck-out tab 46 and screw 48. In the illustrated arrangement frame 44 carries a non-magnetic tubular guide 50 which encloses a nagnetic armature 52.

As shown best in FIG. 1, armature 52 is provided with a threaded extension 54 which is embedded in one end of nozzle member 22. The upper portion of member 22 is slidably accommodated within a slideway 56 formed in the lower face of housing member 12. Thus, armature 52 and nozzle member 22 move as a unit to the FIG. 1 position in response to energization of solenoid coil 40.

Member 22 is not required to seal duct 18, and it can therefore have a loose friction-free fit in the slideway channels 20 and 56. Freedom from friction may further be promoted by mounting member 22 on parallel spring leaf arms. In the illustrated arrangement the spring leaf arms are formed from a unitary member 58 which comprises two spring arms 60 and 62, and an interconnecting bridge section 64. The spring member is arranged with its bridge section lying alongside the upper face of member 22 as shown in FIG. 2. Apertures are formed in arms 60 and 62 to receive stud portions 54 and 66, whereby to firmly retain the spring member on nozzle member 22. The curled end portions of the spring arms are anchored in suitable circular cavities in member 12 as shown in FIG. 1.

Spring member 58 is preferably preformed so that in its installed position it exerts a biasing action tending to move members 22 and 52 in the arrow 68 direction. Thus, upon de-energization of coil 40 nozzle member 22 is moved from the FIG. 1 position to the FIG. 3 position. Further arrow 68 movement is prevented by engagement of spring arm 60 with housing surface 70 (FIG. 1). Member 58 functions as a biasing means and also as a means for floatably mounting member 22 in low friction relation to the housing slideway surfaces.

It will be seen that the orifice in nozzle member 22 provides two edge surfaces or obstructions 72 and 74. In the FIG. 1 position the spacing between surface 72 and offset surface 32 is less than the spacing between surface 74 and surface 34. I have found that when nozzle 22 is in the FIG. 1 position the jet of fluid issuing through the nozzle is drawn to surface 32, presumably because the low pressures adjacent surface 32 are more effective in attracting the jet than those adjacent surface 34. Movement of the nozzle to the FIG. 3 position has the effect of immediately causing the jet to switch over to surface 34, presumably because the spacing between surfaces 74 and 34 is then less than the spacing between surfaces 72 and 32. The switching action has been found to be instantaneous.

In the FIG. 1 construction duct 18 is located midway between boundary layer surfaces 32 and 34. However it is not believed that such a position is essential. FIG. 5 illustrates a proposed arrangement wherein duct 18 is offset toward boundary layer surface 34. In the illustrated position of the nozzle surfaces 72 and 74 are aligned with the surfaces of duct 18, and the fluid jet therefor is offset toward surface 34 in accordance with the offsetting of the inlet duct; it is believed that the fluid will thus lock onto surface 34. When the nozzle is moved in the arrow 73 direction obstructing surface 72 moves relatively close to surface 32, and the fluid will apparently be drawn toward surface 32 in the same manner as described previously in connection with the description of FIG. 1.

The FIG. 1 and FIG. 3 forms utilize nozzles having two movable obstructing surfaces. It is believed however that the invention can be practiced with a member having only one movable obstructing surface. For example, FIG. 7 illustrates a proposed arrangement wherein movable member 22a has only one obstructing surface 72. In the illustrated position of members 22a the spacing between surfaces 74 and 34 is less than the spacing between surfaces 72 and 32 so that the fluid jet presumably will be locked onto surface 34. Movement of member 22a such that surface 72 reaches the dotted line position will presumably allow the low pressure adjacent surface 32 to predominate over that adjacent surface 34, to thus switch the fluid onto surface 32.

It will be noted that in the embodiments of FIGS. 3 and 5 the downstream face of member 22 forms two separate steps between the side edge surfaces of orifice 24 and boundary layer walls 32 and 34. Thus, in FIG. 3 a first step is formed by the downstream face area of member 22 between orifice edge 72 and wall 36; a second step is formed by the downstream face area of member 22 between orifice edge surface 74 and wall 34. The fluid will lock onto that wall (32 or 34) which is adjacent the shorter step. In the FIG. 3 position of member 22 the fluid will lock onto wall 34. When member 22 is moved to the FIG. 1 position the fluid will lock onto wall 32.

In the FIG. 1 construction wall surface 32 leads to a circular outlet 78 which projects upwardly from housing member 12 (see FIG. 2). Similarly, surface 34 leads to a circular outlet (not visible) which projects upwardly from member 12. The fluid thus makes a right angled turn as it leaves the switch. It has been found that as the fluid flows along surface 32 or 34 it tends to form a swirl as it enters the circular outlet. This swirling action interferes with the flow capacity and is objectionable. To eliminate the swirl I have provided two partitions 80 and 82, one in each outlet path. These partitions break up the swirling action without otherwise interfering with the flow.

In some installations it may be desirable to provide check valves in one or both outlet paths. FIG. 2 shows one suitable check valve comprising a movable disc 84 having a pin 86 slidably disposed in an apertured plate 88. Upward flow through plate apertures 90 is permitted, but reverse flow is prevented by disc 84.

One suitable use for the fluid switch is in the control of air conditioner fluid. As shown in FIG. 4 the conditioner system may comprise a central source 92 for heating or cooling fluid (such as hot or cold water), and a series of individual room conditioner coils 94. Each coil is provided with a bypass line 96 so that water delivered by pump 98 can flow through each coil or bypass same under the control of the individual fluid switches 10. Each solenoid 38 can conveniently be controlled by a conventional room thermostat 100 which is responsive to room conditioning demand, either heating or cooling. In the illustrated system the water flow is continuous, and regulation of the room temperature is accomplished by the action of switch 10 in selectively directing the heat exchange liquid into coil 94 or its bypass 96. For best performance a check valve may be provided in one or both of the switch 10 outlets, as previously outlined.

It will be understood that each individual air conditioner may be provided with a blower, inductor, or other means (not shown) for directing air across the conditioner coil.

The invention is susceptible of some modification. For example, it is believed that other power means than the illustrated solenoid can be employed to operate the obstructing member 22 or 22a. Thus, it is believed that thermostatic power means of the remote bulb type or bimetal type could be employed in lieu of solenoid 38. The primary concept of this invention resides in the use of the obstructing member 22 or 22a for selectively directing the nozzle fluid to permit the desired lock-on action without need for the auxiliary control jets which have heretofore been considered necessary.

What is claimed:

1. In a fluid switch comprising an outlet duct and two opposed fluid lock-on walls downstream therefrom defining two low pressure regions effective to selectively lock flowing fluid against the opposed walls by boundary layer action: the improvement comprising a slideway extending transversely across the outlet end of the duct; an orifice member movably mounted in said slideway; and mechanical power means operably arranged to move the orifice member between a first position in which it directs the fluid toward one of the low pressure regions and a second position in which it directs the fluid toward the other low pressure region; the orifice in said movable member defining two opposed orifice side edges, the spacing between the side edges being materially less than the spacing between the lock-on walls so that the downstream face of the orifice member forms separate steps between respective ones of the orifice side edges and respective ones of the lock-on walls; one step being shorter than the other in the first position of the movable member, and the other step being shorter than said one step in the second position of the movable member, whereby the fluid will lock onto that wall which is adjacent the shorter step.

2. The fluid switch of claim 1 and further comprising an air conditioning system having a room conditioner coil and a coil bypass, said fluid switch having its inlet duct receiving conditioner fluid from a remote source and its two boundary layer walls directing the fluid into the room conditioner coil and a coil bypass, respectively; said mechanical power means being operable in response to room conditioning demand to operate the orifice member between its first and second positions.

References Cited by the Examiner

UNITED STATES PATENTS

| | | | |
|---|---|---|---|
| 2,043,714 | 6/1936 | Schellin | 239—447 X |
| 2,228,015 | 1/1941 | Neukirch. | |
| 2,747,842 | 5/1956 | Shataloff | 165—22 |
| 2,761,737 | 9/1956 | Nurkiewicz | 239—447 X |
| 2,806,675 | 9/1957 | Conradi | 165—22 X |
| 3,005,533 | 10/1961 | Wadey | 137—81.5 |
| 3,020,714 | 2/1962 | Eggers et al. | 137—81.5 X |
| 3,072,147 | 1/1963 | Aller et al. | 137—81.5 |
| 3,102,389 | 9/1963 | Pedersen et el. | |
| 3,144,208 | 8/1964 | Severson. | |
| 3,159,208 | 12/1964 | Joesting | 137 |
| 3,171,421 | 3/1965 | Joesting | 137—81.5 |
| 3,176,703 | 4/1965 | Sparrow | 137—81.5 |
| 3,187,762 | 6/1965 | Norwood | 137—81.5 |
| 3,209,775 | 10/1965 | Dexter et al. | 137—81.5 |

FOREIGN PATENTS 1,083,607   6/1960   Germany.

M. CARY NELSON, *Primary Examiner.*

S. SCOTT, *Assistant Examiner.*